Patented Dec. 12, 1933

1,939,292

UNITED STATES PATENT OFFICE 1,939,292

CHLORINATION OF METHYL CHLORIDE

Paul Johnson Carlisle, Niagara Falls, N. Y., assignor, by mesne assignments, to E. I. du Pont de Nemours and Company, a corporation of Delaware No Drawing. Application October 11, 1927
Serial No. 225,603

9 Claims. (Cl. 260—166)

This invention relates to the chlorination of methyl chloride and has for its object the production of methylene chloride and chloroform under such conditions that only a relatively small amount of the methyl chloride will be converted into carbon tetrachloride, carbon and other products.

Some of the possible reactions in the chlorination of methyl chloride are as follows:

(a) $CH_3Cl + Cl_2 = C + 3HCl$
(b) $CH_3Cl + Cl_2 = CH_2Cl_2 + HCl$
(c) $CH_3Cl + 2Cl_2 = CHCl_3 + 2HCl$
(d) $CH_3Cl + 3Cl_2 = CCl_4 + 3HCl$
(e) $CH_2Cl_2 + Cl_2 = CHCl_3 + HCl$
(f) $CH_2Cl_2 + 2Cl_2 = CCl_4 + 2HCl$
(g) $CHCl_3 + Cl_2 = CCl_4 + HCl$

In general, the most valuable products are methylene chloride and chloroform and hence reactions (b), (c) and (e) are the ones which it is desired to favor. Reactions (a), (d), (f) and (g) are less desirable and should be suppressed as far as possible.

To avoid carbonization according to reaction (a) it is necessary to avoid high temperatures and two large a percentage of chlorine in the reaction mixture. The carbonization of methyl chloride by chlorine is a highly exothermic reaction and if locally started within a catalyst mass it rapidly spreads. Catalysts may be used, but I have found that satisfactory results may be obtained, and some of the difficulties avoided by utilizing merely heated reaction chambers.

Theoretically, for the production of methylene chloride as the sole product for each volume of methyl choride used there would be required one volume of chlorine; for the production of chloroform as the sole product, it would be necessary to use two volumes of chlorine for each volume of methyl choride. However, I have found that it is not feasible to react mixtures of these proportions since if chlorine is present in a concentration much greater than 46% by volume a considerable amount of carbonization occurs according to reaction (a).

I have found that mixtures which will give little or no trouble from carbonization consists of about 0.85 or less volumes of chlorine to one volume of methyl chloride; a mixture for example containing 0.75 volumes of chlorine has given excellent results. Of course this means that excess methyl chloride must be used and that the unreacted portion is again passed through the reaction chamber after the methylene chloride, chloroform and other reaction products have been removed. In general, approximately 50% of the methyl chloride passing through the reaction chamber undergoes reaction. Other gases, inert to the reactants or products may be present.

I have also found a method by which it is possible to treat a given volume of methyl chloride with a volume of chlorine much larger than the ratio given above without intermediate separation of reaction products. If the mixture consisting of one volume of methyl chloride and about 0.73 volume of chlorine is passed through the reaction chamber under suitable temperature and rate conditions and the reaction products allowed to cool partially and then a second portion or installment of chlorine introduced at an appropriate point in the reaction chamber, it is found that the partial cooling of the gases before admixture with the second portion of chlorine and probably the diluting effect of the various reaction products makes it possible to bring about a further chlorination with only a very small increase in carbonization. Incidentally it is possible in this way to produce relatively more chloroform and less methylene chloride. It is true that under the conditions of this two stage process somewhat more carbon-tetrachloride is formed and some condensation products, for example hexa-chlorethane ($C_2Cl_6$) are produced. However, if the conditions are properly controlled, the losses from these two sources are relatively small, and are much less than if the total chlorine had been added in one stage.

Temperature control of the reacting mixture depends on several factors, chief of which are:

1. Ratio of chlorine to methyl chloride.
2. Rate of feed of gases—space velocities.
3. Reaction vessel heat balance—i. e. volume, surface and insulation of the reaction space.

The space velocities at which the reacting gases are passed through the reactor depend largely upon the temperature of operation and upon the heat balance, i. e., upon the relation between the volume and the surface of the reaction chamber. A chlorine space velocity of about 200 has been found satisfactory with an empty quartz reaction chamber; by this I mean 200 volumes per hour of chlorine gas (calculated at N. T. P., i. e. standard conditions of 0° C. and 760 mm pressure) per volume of reaction chamber. However, a very wide variation is possible and the invention, is not limited to any specific rate.

Chlorine and methyl chloride react satisfactorily at temperatures between 400° and 650° C.; the optimum temperature range is between 440° and 525° C. Methylene chloride is formed in good yield above 525° C. but it becomes increasingly difficult to avoid carbonization as the temperature rises and above 650° C. it is practically impossible to control the reaction.

Example

A reaction chamber was constructed of a quartz tube having an inside diameter of 1⅛ inches. The tube was heated by an external electrical resistance coil for a length of 12 inches. The volume of the heated chamber was about 195 cubic centimeters. Through this space 0.8 liter of chlorine and 1,050 liter of methyl chloride was passed per minute at an average temperature in the reaction zone of about 505° C. Of the chlorine available theoretically for chlorides of methane this was the distribution:

|                  | Percent |
|------------------|---------|
| As $CH_2Cl_2$    | 55.8    |
| As $CHCl_3$      | 26.2    |
| As $CCl_4$       | 5.2     |
| As other products| 12.8    |

Of the methyl chloride which reacted, the distribution was:

|                  | Percent |
|------------------|---------|
| As $CH_2Cl_2$    | 77.4    |
| As $CHCl_3$      | 18.1    |
| As $CCl_4$       | 2.4     |
| As other products| 2.1     |

Approximately 45% of the methyl chloride fed remained unreacted and was recovered as such. This recovered methyl chloride was of course available for recirculation through the same or another reactor.

I claim:

1. Process for the manufacture of methylene chloride and chloroform comprising subjecting a mixture consisting of methyl chloride and chlorine to a reacting temperature, said mixture continuously containing less than 46% by volume of chlorine.

2. Process for the manufacture of methylene chloride and chloroform comprising passing a mixture consisting of methyl chloride and chlorine at a temperature between 400° C. and 650° C. through a reaction chamber, said mixture continuously containing less than 46% by volume of chlorine.

3. Process for the manufacture of methylene chloride and chloroform comprising subjecting a mixture consisting of methyl chloride and chlorine to a reacting temperature, said mixture continuously containing less than 46% by volume of chlorine and thereafter reacting the resulting reaction mixture with a further quantity of chlorine at a reacting temperature, said increment being less than 85% by volume of the chlorohydrocarbons in said mixture.

4. Process for the manufacture of methylene chloride and chloroform comprising reacting a mixture consisting of methyl chloride and chlorine continuously containing less than 46% by volume of chlorine at a temperature between 400° C. and 650° C. cooling the reaction products and subjecting said mixture to a further increment of chlorine at a reacting temperature, said increment being less than 85% by volume of the chlorohydrocarbons in said mixture.

5. Process for the manufacture of methylene chloride and chloroform comprising reacting a mixture consisting of methyl chloride and chlorine continuously containing less than 46% by volume of chlorine at a temperature between 400° C. and 650° C. cooling the reaction products to a temperature approximately that of the initial reaction temperature and subjecting said mixture to a further increment of chlorine at a reacting temperature, said increment being less than 85% by volume of the chlorohydrocarbons in said mixture.

6. Process for the manufacture of methylene chloride and chloroform comprising reacting a mixture consisting of methyl chloride and chlorine continuously containing less than 46% by volume of chlorine at a temperature between 400° C. and 650° C., cooling the reaction products and subjecting said mixture to a further increment of chlorine and repeating the process.

7. Process for the manufacture of methylene chloride and chloroform comprising reacting a mixture consisting of methyl chloride and chlorine continuously containing less than 46% by volume of chlorine at a temperature between 400° C. and 650° C., cooling the reaction products to a temperature approximately that of the initial reaction temperature and subjecting said mixture to a further increment of chlorine in a like manner.

8. Process for the manufacture of methylene chloride and chloroform comprising subjecting a mixture consisting of methyl chloride and chlorine to a reactive temperature, said mixture containing an excess of methyl chloride.

9. Process for the manufacture of methylene chloride comprising subjecting a mixture consisting of methyl chloride and chlorine to a reactive temperature, said mixture containing an excess of methyl chloride.

PAUL JOHNSON CARLISLE.